E. T. FORD.
Finger Bar for Harvesters.
No. 83,619.
Patented Nov. 3, 1868.
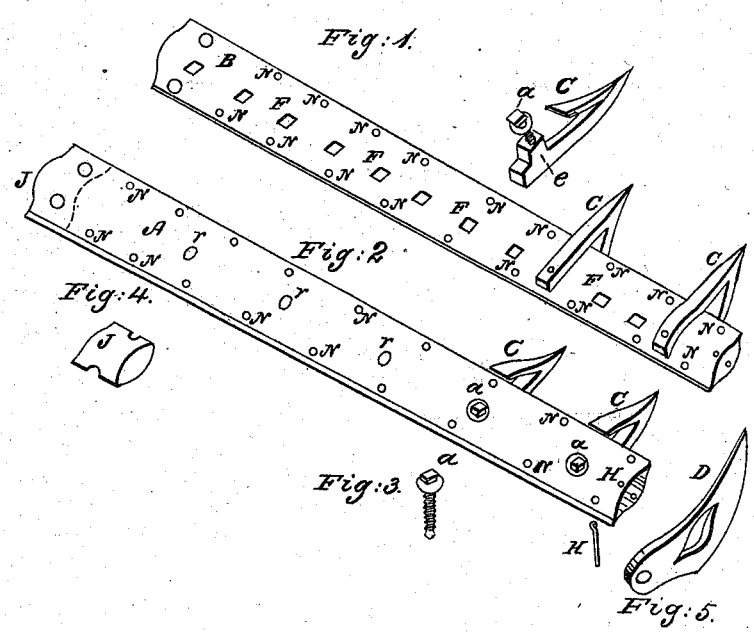
Witnesses:
E. T. Ford
Inventor:

UNITED STATES PATENT OFFICE.

ELIAS T. FORD, OF STILLWATER, NEW YORK.

IMPROVEMENT IN FINGER-BARS FOR HARVESTERS.

Specification forming part of Letters Patent No. 83,619, dated November 3, 1868.

*To all whom it may concern:*

Be it known that I, ELIAS T. FORD, of the town of Stillwater, in the county of Saratoga, and the State of New York, have invented new and useful Improvements in Steel Finger-Bars used with Harvesting-Machines; and I do hereby declare that the following is a clear, full, and exact description thereof, reference being had to the accompanying drawings, and to the letters of reference marked thereon.

The nature of my invention consists in constructing a finger-bar composed of two thin plates of steel or cold-rolled wrought-iron, each concave in form. By connecting the two plates, the concaves produce a tube flattened, when riveted together as a whole, thereby producing a light and strong finger-bar, with apertures cut in the bottom plate for the reception of the finger-shanks $e$ of guards or fingers C. Orifices are also cut in the top plate, A, provided for the screws or bolts $a$, which do not materially diminish the strength of the plates as a whole.

To enable others skilled in the art to make and use my invention, I will proceed to describe its construction and operation.

Figure 1 is a view of the bar turned over, presenting the bottom plate, with the apertures F F F, showing the guards C C located therein. Fig. 2 shows the top plate, A, with screw-orifices $r\ r\ r$. The form of the screws $a$ is seen in Fig. 3. The finger or guard is seen near Fig. 1. In Fig. 4 is seen the solid plug J, used at the left extremity of bar A.

The two thin plates A and B are arranged as seen in Figs. 1 and 2, and secured by means of rivets or screws $v\ v\ v\ v$. The plug J is inserted at the left extremity of the bar A B, affording greater solidity at the point of attachment. The right extremity is left open, for the purpose of letting the fine grass pass out with dirt and other matter.

The shoe D is inserted upon the right extremity of the bar A B, and is retained by the pin H. The pin H and shoe D are seen in Fig. 5. The screw $a$ is now taken out of the shank $e$ of the finger or guard C, as seen near Fig. 1, and the finger or guard C is turned over and located upon the bottom plate, B, the shank $e$ entering the aperture F, as seen in Fig. 1.

The finger-bar, with guards or fingers C C, is now turned over, as seen in Fig. 2, and the screw $a$, with washer, is put through the top orifice, $r$, entering the shank $e$, and passing through the finger or guard C. In like manner all the guards C C may be secured.

The apertures F and $r$ are elongated a little, and by the oval form of the top and bottom plates, A and B, the fingers C can be made secure and retained snugly, and giving greater strength to the plates A B and guards C combined as a unit, thereby producing a strong, light, and durable finger-bar, and for its convenience in operation.

What I claim, and desire to secure by Letters Patent, is—

The oval plates A B, provided with apertures F and $r$, in combination with the guard-fingers C, provided with shanks $e$, screws $a\ a$, and metal plug J, all constructed and arranged substantially as described.

ELIAS T. FORD.

Witnesses:
SAML. G. EDDY,
J. B. BUFFINTON.